(12) United States Patent
Lee et al.

(10) Patent No.: US 10,739,940 B2
(45) Date of Patent: Aug. 11, 2020

(54) MOBILE TERMINAL FOR GENERATING A FOLDER BY USING ICONS CORRESPONDING TO APPLICATIONS AND METHOD OF CONTROLLING THE SAME

(71) Applicant: LG ELECTRONICS INC., Seoul (KR)

(72) Inventors: Sunhyuk Lee, Seoul (KR); Changju Na, Seoul (KR); Jaeyoon Hyun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 266 days.

(21) Appl. No.: 15/514,467

(22) PCT Filed: Dec. 11, 2014

(86) PCT No.: PCT/KR2014/012234
§ 371 (c)(1),
(2) Date: Mar. 24, 2017

(87) PCT Pub. No.: WO2016/076474
PCT Pub. Date: May 19, 2016

(65) Prior Publication Data
US 2017/0277400 A1     Sep. 28, 2017

(30) Foreign Application Priority Data
Nov. 14, 2014   (KR) .................. 10-2014-0159109

(51) Int. Cl.
*G06F 3/0482* (2013.01)
*G06F 3/0483* (2013.01)
(Continued)

(52) U.S. Cl.
CPC ........ *G06F 3/04817* (2013.01); *G06F 3/0482* (2013.01); *G06F 3/0483* (2013.01); *G06F 3/04883* (2013.01)

(58) Field of Classification Search
CPC .. G06F 3/04817; G06F 3/0482; G06F 3/0483; G06F 3/04883
See application file for complete search history.

(56) References Cited

U.S. PATENT DOCUMENTS 6,985,905 B2 * 1/2006 Prompt ................. G06F 16/252
707/829
7,248,290 B2 * 7/2007 Shioji ..................... G11B 27/11
348/231.2
(Continued)

FOREIGN PATENT DOCUMENTS

CN     104063129 A  *  9/2014
EP     2372516         10/2011
(Continued)

OTHER PUBLICATIONS

PCT International Application No. PCT/KR2014/012234, International Search Report dated Jun. 25, 2015, 4 pages.
(Continued)

*Primary Examiner* — Daniel Samwel
(74) *Attorney, Agent, or Firm* — Lee, Hong, Degerman, Kang & Waimey

(57) ABSTRACT

A mobile terminal is capable of automatically editing icons corresponding to a plurality of applications included in a home screen page. The mobile terminal includes: a touch screen configured to output a home screen page including icons corresponding to applications; and a controller configured to generate a folder including at least part of the applications by using attribute information of the applications, when an edition request with respect to the icons included in the home screen page is received, wherein an
(Continued)

image of the generated folder, rather than the icons corresponding to the applications included in the generated folder, is output to the home screen page.

19 Claims, 16 Drawing Sheets

(51) Int. Cl.
*G06F 3/0488* (2013.01)
*G06F 3/0481* (2013.01)

(56) References Cited

U.S. PATENT DOCUMENTS

| | | | | |
|---|---|---|---|---|
| 7,437,005 | B2* | 10/2008 | Drucker | G06F 3/0483 |
| | | | | 382/224 |
| 2003/0163467 | A1* | 8/2003 | Cazier | G06F 16/29 |
| 2011/0179097 | A1* | 7/2011 | Ala-Rantala | G06F 3/0482 |
| | | | | 707/829 |
| 2011/0252346 | A1* | 10/2011 | Chaudhri | G06F 3/0482 |
| | | | | 715/765 |
| 2012/0052918 | A1 | 3/2012 | Yang | |
| 2013/0024794 | A1 | 1/2013 | Ha et al. | |
| 2013/0166527 | A1* | 6/2013 | Kasterstein | G06F 3/04817 |
| | | | | 707/706 |
| 2013/0219319 | A1* | 8/2013 | Park | G06F 3/0488 |
| | | | | 715/775 |
| 2013/0254692 | A1 | 9/2013 | Han | |
| 2014/0101616 | A1* | 4/2014 | Kim | G06F 3/0488 |
| | | | | 715/846 |
| 2014/0250391 | A1* | 9/2014 | Jong | G06F 3/0483 |
| | | | | 715/763 |
| 2014/0317542 | A1* | 10/2014 | Kim | G06F 3/0486 |
| | | | | 715/765 |
| 2014/0324873 | A1* | 10/2014 | Lee | G06F 9/451 |
| | | | | 707/740 |
| 2015/0106737 | A1* | 4/2015 | Montoy-Wilson | G06F 9/451 |
| | | | | 715/745 |
| 2017/0371535 | A1* | 12/2017 | Li | G06F 3/04817 |

FOREIGN PATENT DOCUMENTS

| | | |
|---|---|---|
| KR | 20060056027 | 5/2006 |
| KR | 20130010364 | 1/2013 |
| KR | 20130080179 | 7/2013 |
| KR | 20140125675 | 10/2014 |

OTHER PUBLICATIONS

National Institute of Industrial Property French Patent Application No. 1554764, Search Report dated Apr. 6, 2017, 7 pages.

* cited by examiner

US 10,739,940 B2

MOBILE TERMINAL FOR GENERATING A FOLDER BY USING ICONS CORRESPONDING TO APPLICATIONS AND METHOD OF CONTROLLING THE SAME

CROSS-REFERENCE TO RELATED APPLICATIONS

This application is the National Stage filing under 35 U.S.C. 371 of International Application No. PCT/KR2014/012234, filed on Dec. 11, 2014, which claims the benefit of earlier filing date and right of priority to Korean Application No. 10-2014-0159109, filed on Nov. 14, 2014, the contents of which are all hereby incorporated by reference herein in their entirety.

BACKGROUND OF THE INVENTION

1. Field of the Invention

The present invention relates to a mobile terminal, and more particularly, to a mobile terminal capable of generating a folder by using icons corresponding to applications, and a method of controlling the same.

2. Background of the Invention

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Various attempts have been made to implement complicated functions in such a multimedia device by means of hardware or software.

A user may arrange an icon corresponding to a frequently-used application, among applications installed at the mobile terminal, on a home screen page. However, since the home screen page is composed of a plurality of pages, it is difficult to arrange icons corresponding to applications and positioned on the respective pages in a scattered manner.

SUMMARY OF THE INVENTION

Therefore, an aspect of the detailed description is to provide a mobile terminal capable of automatically editing icons corresponding to applications and included in a home screen page in a scattered manner, based on attribute information of applications.

To achieve these and other advantages and in accordance with the purpose of this specification, as embodied and broadly described herein, there is provided a mobile terminal, including: a touch screen configured to output a home screen page including icons corresponding to applications; and a controller configured to generate folders including at least part of the applications by using attribute information of the applications, when an edition request with respect to the icons included in the home screen page is received, wherein images of the generated folders, rather than the icons corresponding to the applications included in the generated folder, is output to the home screen page.

In an embodiment of the present invention, the controller may control applications having similar attribute information among the applications, to be included in the same folder.

In an embodiment of the present invention, the attribute information of the applications may be at least one of a type of the applications, a usage frequency of the applications, and a usage time point of the applications.

In an embodiment of the present invention, if a folder including at least part of the applications is generated, the controller may output an indicator indicating generation of the folder, to the touch screen. If a preset touch input is received in correspondence to the output of the indicator, the controller may output an image of the generated folder, to the home screen page.

In an embodiment of the present invention, the preset touch input may be a preset type of touch input applied to an output region of the indicator.

In an embodiment of the present invention, the home screen page may include a plurality of pages, and the controller may output an image of the generated folder, to a page selected based on a direction of the preset type of touch input, among the plurality of pages.

In an embodiment of the present invention, if the preset touch input is not received for a preset time in the output state of the indicator, the controller may terminate the output of the indicator.

In an embodiment of the present invention, if the output of the indicator is terminated, the generated folder may be deleted.

In an embodiment of the present invention, the home screen page may further include an image of an already-generated folder. If an unfolding request with respect to the already-generated folder is received, the controller may move a specific application included in the already-generated folder, to a folder corresponding to attribute information of the specific application, among the generated folders.

In an embodiment of the present invention, in a state where an image of the folder including the specific application has been output, if a touch input is applied to the image, the controller may output an icon corresponding to the specific application to the touch screen.

In an embodiment of the present invention, an icon corresponding to a specific application may be addable to the home screen page according to a user's request. If the user's request is received, the controller may include the specific application in a folder including applications having similar attribute information to the specific application, among folders included in the home screen page. If a touch input is applied to an image of the folder including applications having similar attribute information to the specific application, the controller may output an icon corresponding to the specific application to the touch screen.

In an embodiment of the present invention, if the user's request is received, the controller may output a popup window to the touch screen, the popup window asking a user whether to include the specific application in the folder including applications having similar attribute information to the specific application. The controller may determine whether to include the specific application in the folder including applications having similar attribute information to the specific application, based on a selective input applied to the popup window.

In an embodiment of the present invention, if the user's edition request is received, the controller may output the icons included in the home screen page, and graphic objects corresponding to folders related to attribute information of applications corresponding to the icons, to at least one region of the touch screen.

In an embodiment of the present invention, if a preset touch input is applied to the graphic objects, the controller may output images of the generated folders to the home screen page.

In an embodiment of the present invention, if the attribute information of the application corresponding to the icon is dividable into a plurality of attribute information, a plurality of graphic objects corresponding to the plurality of attribute information may be output to the at least one region of the touch screen. The controller may include the application corresponding to the icon, in a folder corresponding to a graphic object selected by a user among the plurality of graphic objects.

To achieve these and other advantages and in accordance with the purpose of this specification, as embodied and broadly described herein, there is also provided a method of controlling a mobile terminal, including: outputting a home screen page including icons corresponding to applications, to a touch screen; receiving an edition request with respect to the icons included in the home screen page; generating folders including at least part of the applications, by using attribute information of the applications; and outputting, to the home screen page, images of the generated folders, rather than icons corresponding to applications included in the generated folder.

In an embodiment of the present invention, at least two of the applications included in one of the generated folders may have similar attribute information.

In an embodiment of the present invention, the attribute information may be at least one of a type of the applications, a usage frequency of the applications, and a usage time point of the applications.

In an embodiment of the present invention, the method may further include: if a folder including at least part of the applications is generated, outputting an indicator indicating generation of the folder, to the touch screen; and if a preset touch input is received in correspondence to the output of the indicator, outputting an image of the generated folder, to the home screen page.

In an embodiment of the present invention, the method may further include: in a state where an image of an already-generated folder is further included in the home screen page, if an unfolding request with respect to the already-generated folder is received, moving a specific application included in the already-generated folder, to a folder corresponding to attribute information of the specific application, among the generated folders.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart glasses), head mounted displays (HMDs), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
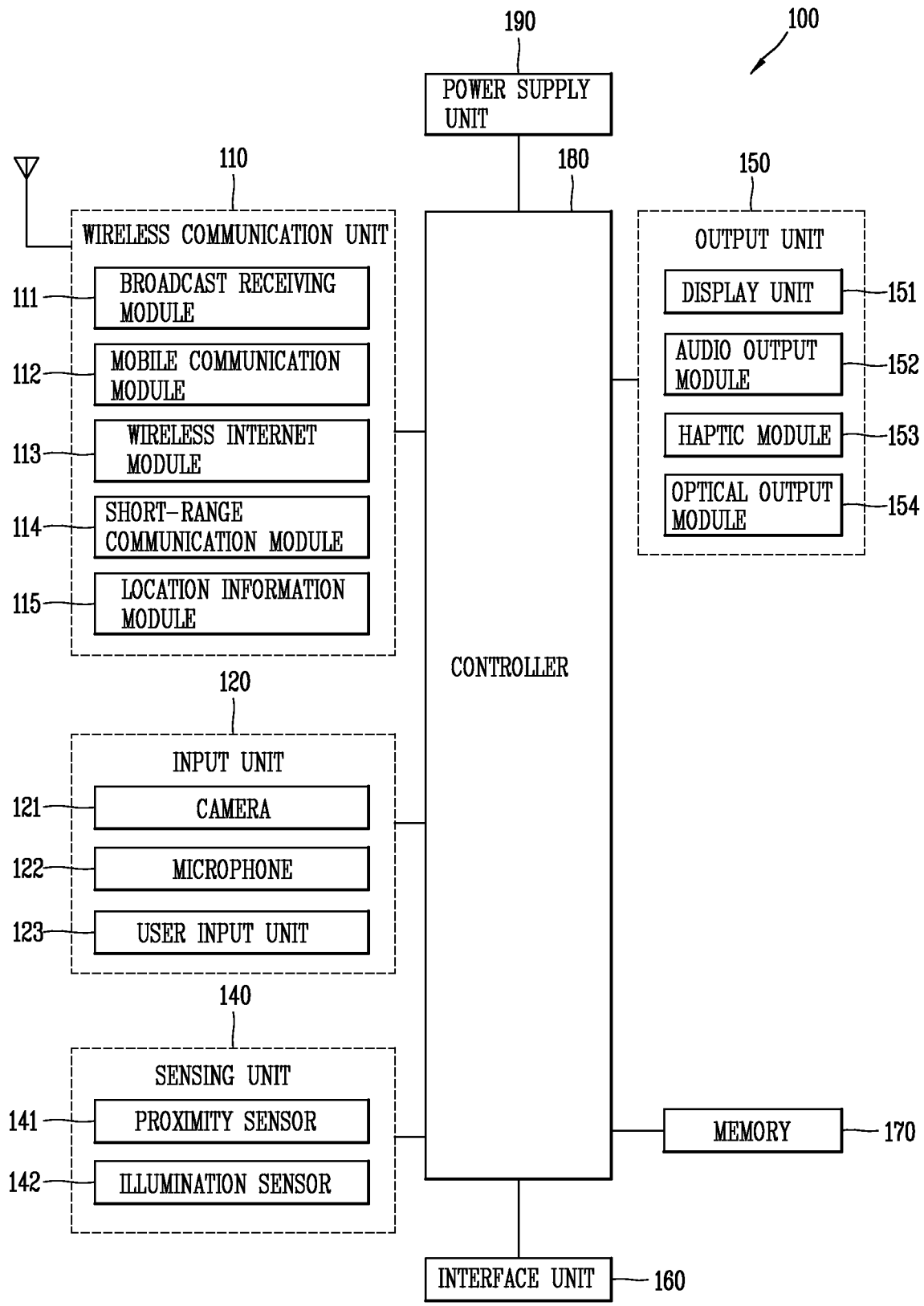
FIG. 1A is a block diagram illustrating a mobile terminal according to the present invention.
Figure 1B:
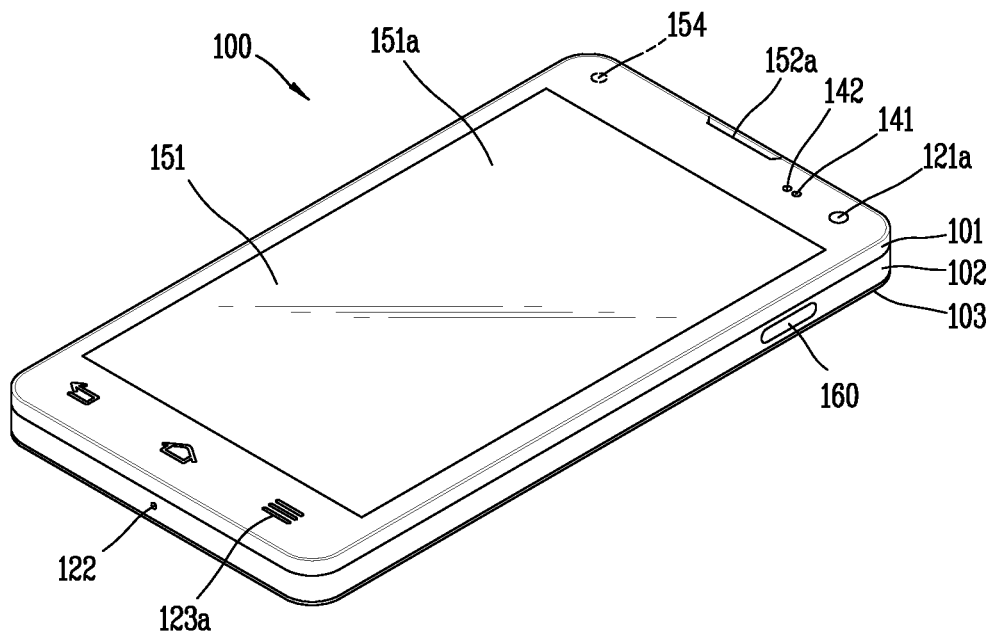
FIGS. 1B and 1C are conceptual views illustrating an example of a mobile terminal according to the present invention, which are viewed from different directions.
Figure 1C:
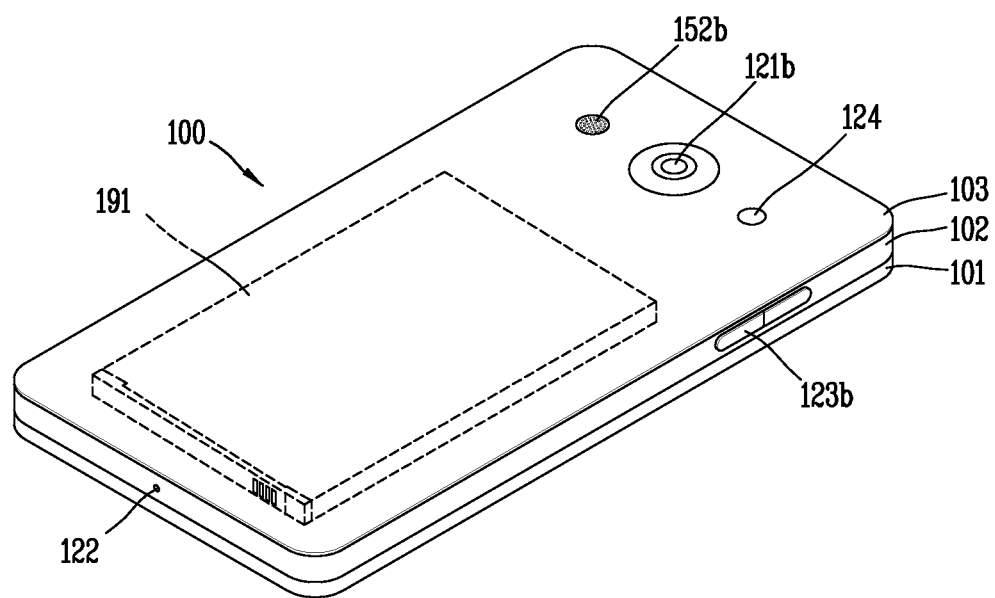

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components of FIG. 1A is not a requirement, and that greater or fewer components may alternatively be implemented.

Referring now to FIG. 1A, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method of a glass type terminal according to various embodiments to be explained later. The operation or the control method of the glass type terminal may be implemented on the glass type terminal by driving at least one application program stored in the memory 170.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), Wideband CDMA (WCDMA), High Speed Downlink Packet access (HSDPA), Long Term Evolution (LTE), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, GSM, CDMA, WCDMA, LTE and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information about the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the mobile terminal. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 10, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

The mobile terminal according to the present invention can easily arrange icons disposed on a plurality of home screen pages in a scattered manner, by automatically sorting the icons, based on attribute information of applications corresponding to the icons included in the home screen pages.

Hereinafter, a function to edit icons corresponding to applications and included in a home screen page of the mobile terminal will be explained in more detail with reference to the attached drawings. In this specification, the drawings will be explained clockwise. It is obvious to those skilled in the art that the present invention may be embodied in other form within the spirit and scope of the present invention.

Figure 2A:
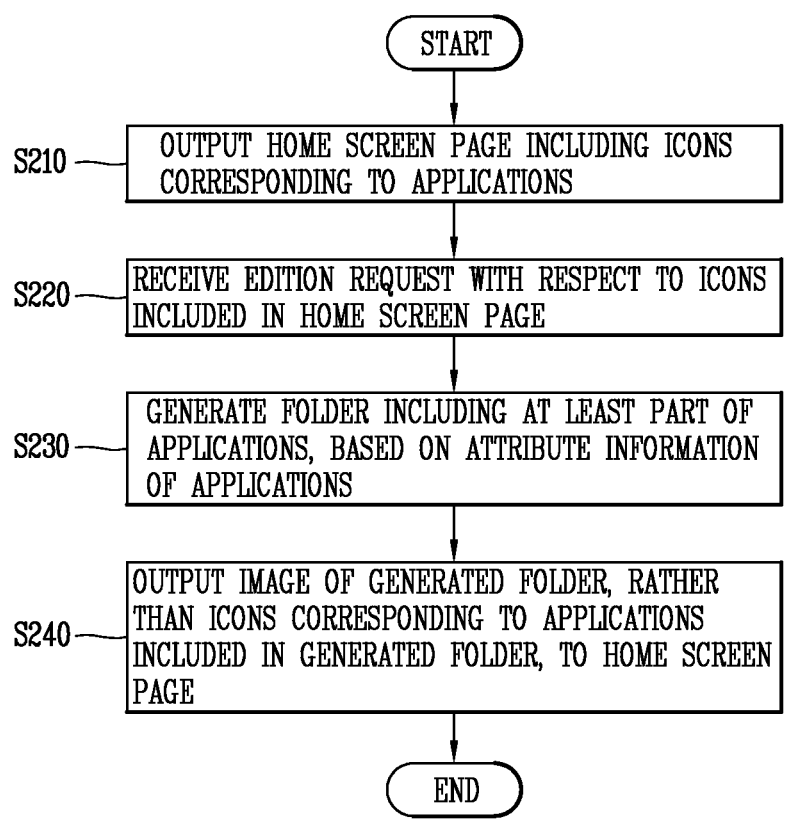
FIG. 2A is a flowchart illustrating a control method of editing icons included in a home screen page according to the present invention.
Figure 2B:
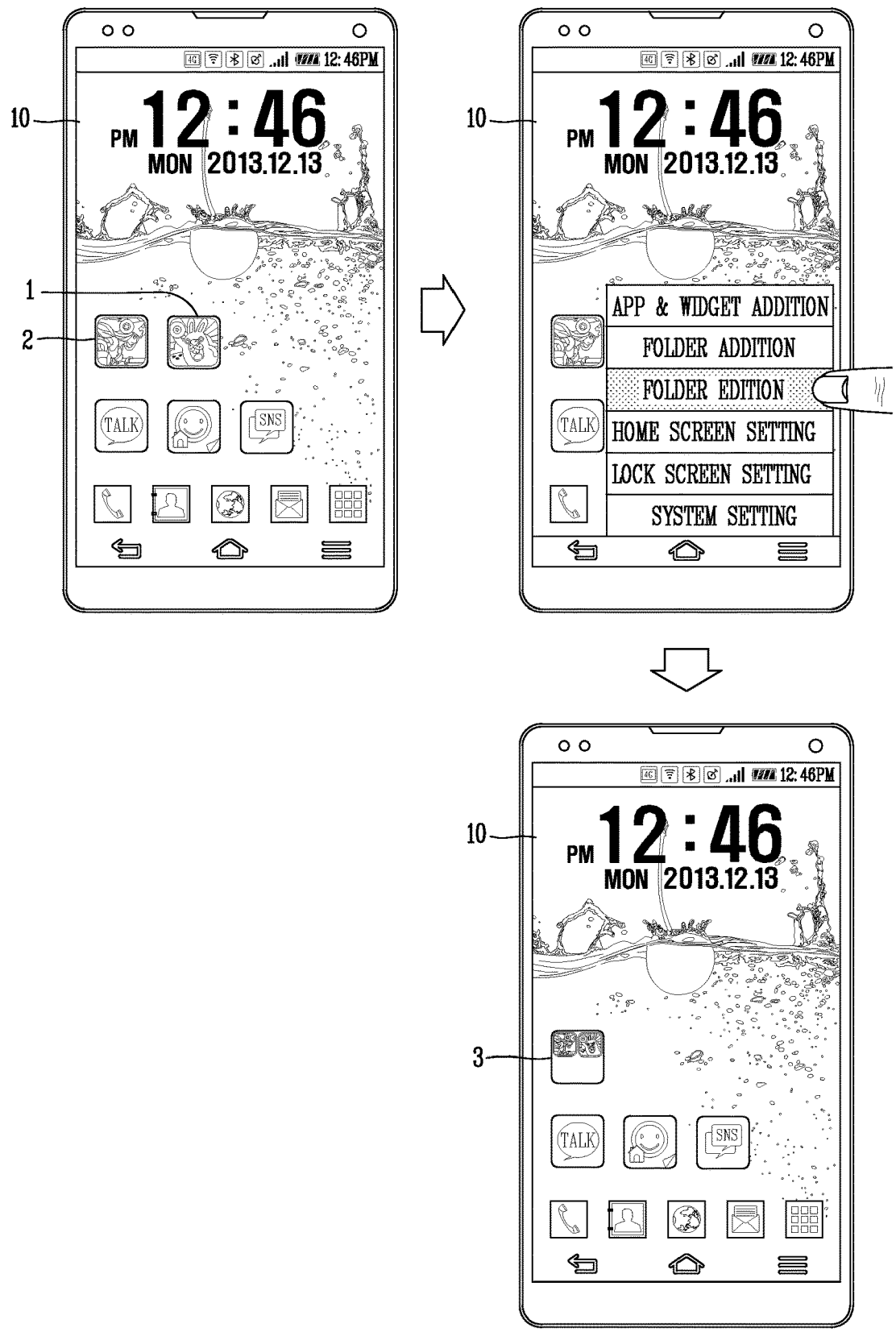
FIG. 2B is a representative view illustrating a control method according to the present invention.

FIG. 2A is a flowchart illustrating a control method of editing icons included in a home screen page according to the present invention. FIG. 2B is a representative view illustrating a control method according to the present invention.

Referring to FIG. 2A, a home screen page including icons corresponding to applications may be output to a touch screen of the mobile terminal according to the present invention (S210).

The icons corresponding to applications may be graphic objects corresponding to applications, arranged on the home screen page by a user so that functions thereof can be immediately performed without an additional search process, among applications installed at the mobile terminal. That is, as shown in a first drawing of FIG. 2B, the home screen page 10 may include a plurality of icons. The home screen page is a kind of work place including icons corresponding to applications selected by a user, which may be composed of a plurality of pages.

Only one of the plurality of home screen pages may be output to the touch screen 151. That is, the home screen page may be output to the touch screen 151 in the unit of page. The single page may be selected based on a user's input. Thus, if output of another page different from the one page among the plurality of home screen pages is requested, the controller 180 may output the requested another page to the touch screen 151.

In an output state of the home screen page, an edition request with respect to icons included in the home screen page may be received (S220).

The edition request may mean a request for arranging icons corresponding to applications included in the home screen page by using a folder. Further, the edition request may be various inputs applied to the mobile terminal in an output state of the home screen page. For instance, the edition request may be an input to execute an edition function with respect to the icons by using a menu button positioned at a bezel portion of the mobile terminal. That is, as shown in a second drawing of FIG. 2B, the edition request may be executed by outputting a setting menu by using the menu button positioned at the bezel portion of the mobile terminal, and by selecting an edition function included in the setting menu in a touch manner.

Alternatively, the edition request may be an input to apply a preset type of touch (e.g., a dragging touch for moving a first icon included in the home screen page toward a second icon) to the touch screen, in an output state of the home screen page. Still alternatively, the edition request may be an input to press an external key mounted to a body of the mobile terminal.

Once the edition request with respect to the icons is received, the controller 180 may generate a folder including at least part of the applications by using attribute information of the applications (S230).

The attribute information of the applications may be at least one of a type of the applications (e.g., a type of execution function, etc.), a usage frequency of the applications, and a usage time point of the applications.

That is, the controller 180 may check attribute information of applications corresponding to icons included in the home screen page, and may generate a folder by using applications having similar attribute information. More specifically, the controller 180 may check an execution function of an application corresponding to each icon included in the home screen page. The controller 180 may control applications having similar execution functions to be included in the same folder. For instance, an internet search application and a map search application each having a search function may be included in the same folder.

As another example, the controller 180 may generate a folder by using applications which have been executed within recent 3 days, among applications corresponding to icons included in the home screen page. The controller 180 may generate a folder including applications which have been used most frequently in order and with a predetermined number, among applications corresponding to icons included in the home screen page.

Once a folder is generated based on attribute information of the applications, an image of the generated folder, rather than icons corresponding to applications included in the generated folder, may be output to the home screen page (S240).

Once the folder is generated, an image of the folder may be output to the home screen page without a user's additional input. Icons corresponding to applications included in the generated folder may be deleted from the home screen page. That is, as shown in a third drawing of FIG. 2B, the controller 180 may generate a single folder by using game applications corresponding to a plurality of icons 1 and 2 included in the home screen page 10, i.e., a folder based on a similar execution function such as 'game'. The controller 180 may output a folder image 3 corresponding to the generated folder, to the home screen page 10.

Once the folder is generated, the controller 180 may output an indicator indicating generation of the folder, to the touch screen 151. In this instance, if a user's preset touch input is received in correspondence to the output the indicator, the controller 180 may output an image of the generated folder, rather than icons corresponding to applications included in the folder, to the home screen page 10. This will be explained in more detail with reference to FIGS. 3A to 3C.

The mobile terminal according to the present invention may automatically arrange icons corresponding to applications and included in the plurality of home screen pages in a scattered manner, based on attribute information of the applications. Thus, a user may be provided with information about icons corresponding to applications included in the plurality of home screen pages, through an image of the generated folder, without outputting the respective home screen pages.

Since the folder is automatically generated, a user may easily arrange icons without an additional input for editing the icons corresponding to applications included in the plurality of home screen pages in a non-uniform manner. For instance, a first icon may be included in a first page among the plurality of home screen pages, and a second icon may be included in a second page among the plurality of home screen pages. If a user's edition request with respect to the home screen pages is received, the controller 180 may generate a single folder image including the first and second icons. The single folder image may be output to the first and second pages, or may be output to another page rather than the first and second pages among the plurality of home screen pages. Once the single folder image is output to the home screen page, the first icon on the first page and the second icon on the second page may be deleted. A page, to which the single folder image is output, may be determined by a user's selection or a preset basis. Thus, a user may easily arrange a plurality of icons on home screen pages, by using the mobile terminal according to the present invention.

As aforementioned, an image of a folder generated based on attribute information of applications may be automatically output to the home screen page, and output thereof may be determined based on a user's input applied to an indicator indicating generation of the folder. This will be explained in more detail with reference to FIGS. 3A to 3C.

Figure 3A:
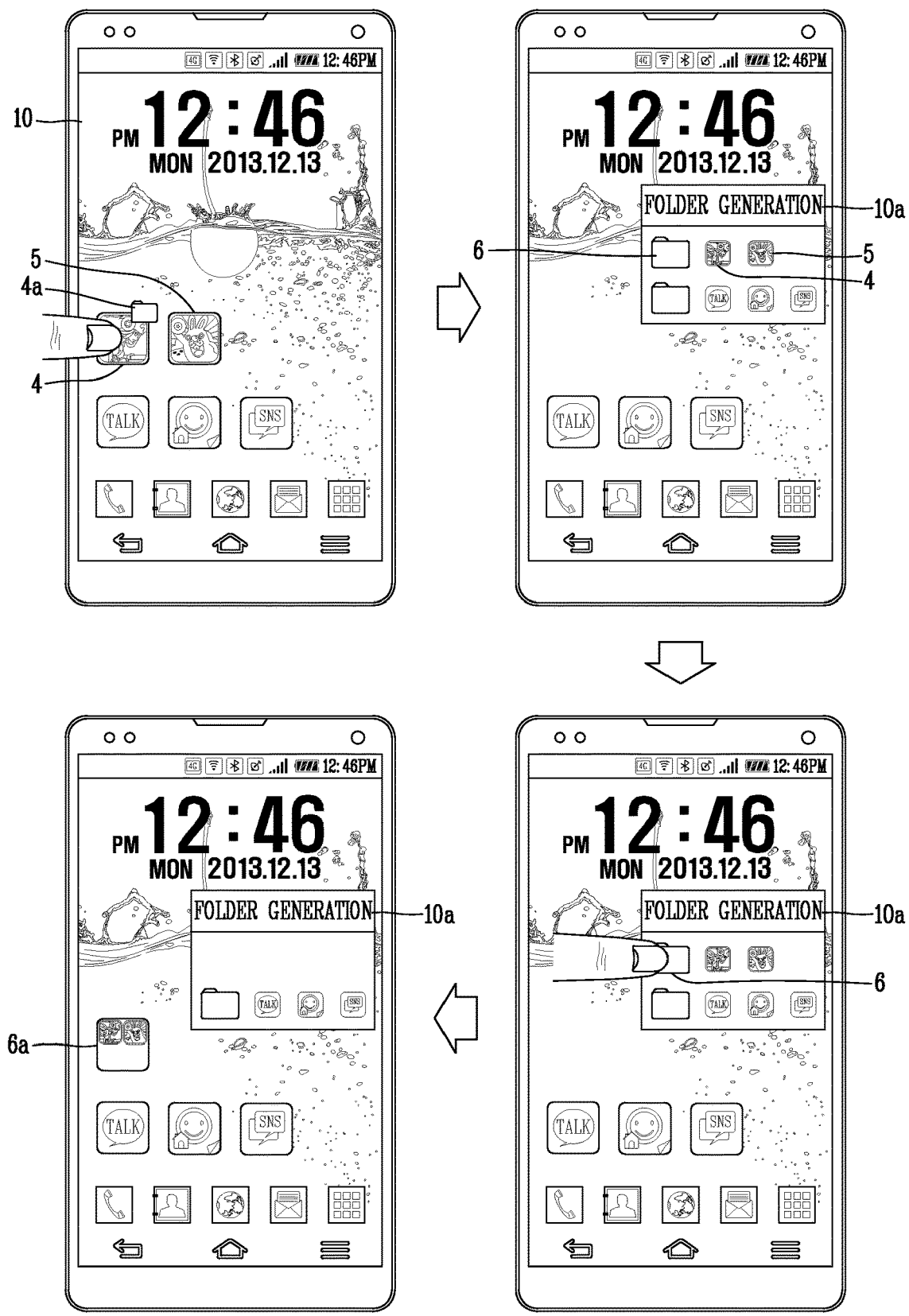
FIGS. 3A to 3C are views illustrating embodiments to output an indicator indicating generation of a folder.
Figure 3B:
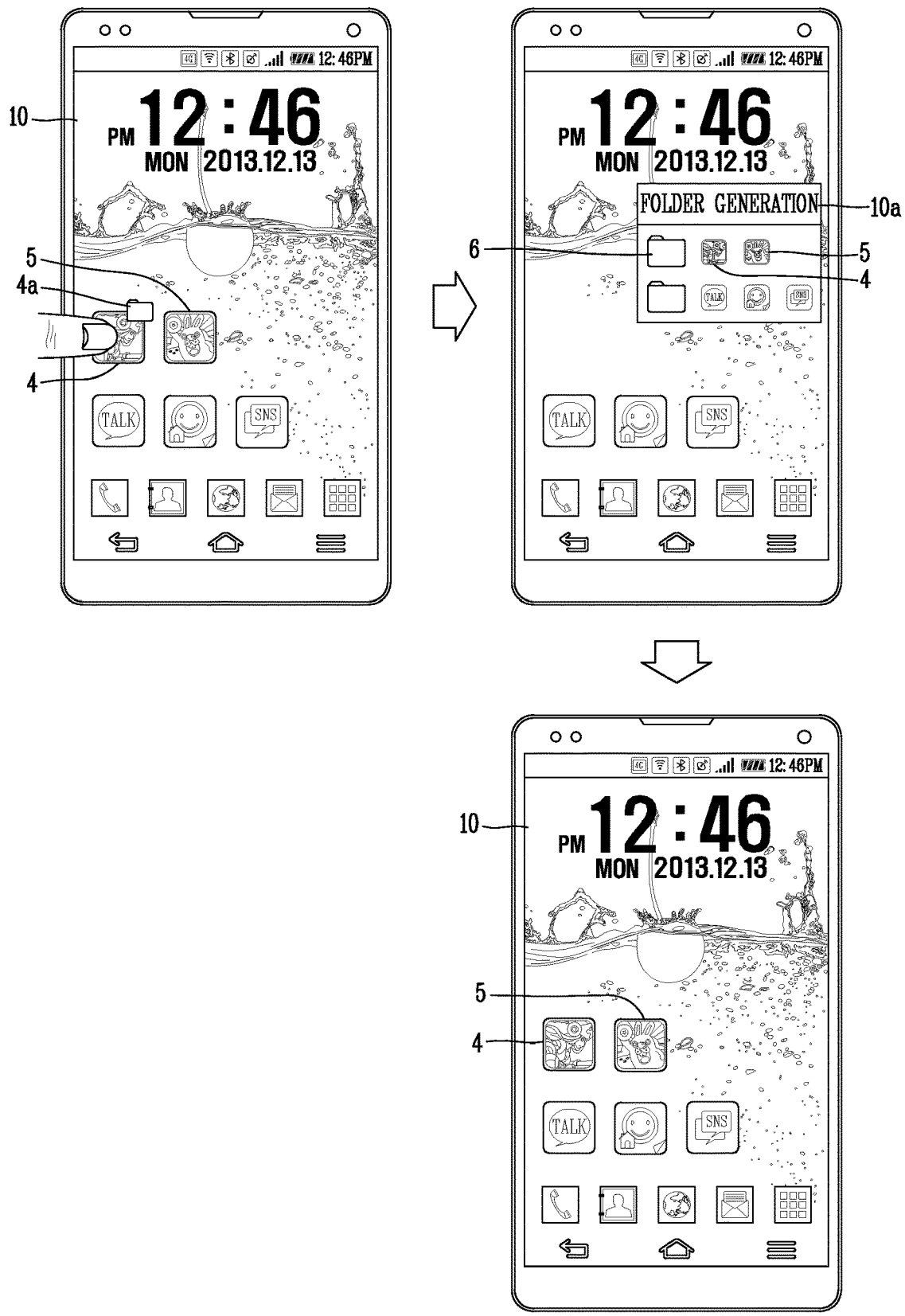
Figure 3C:
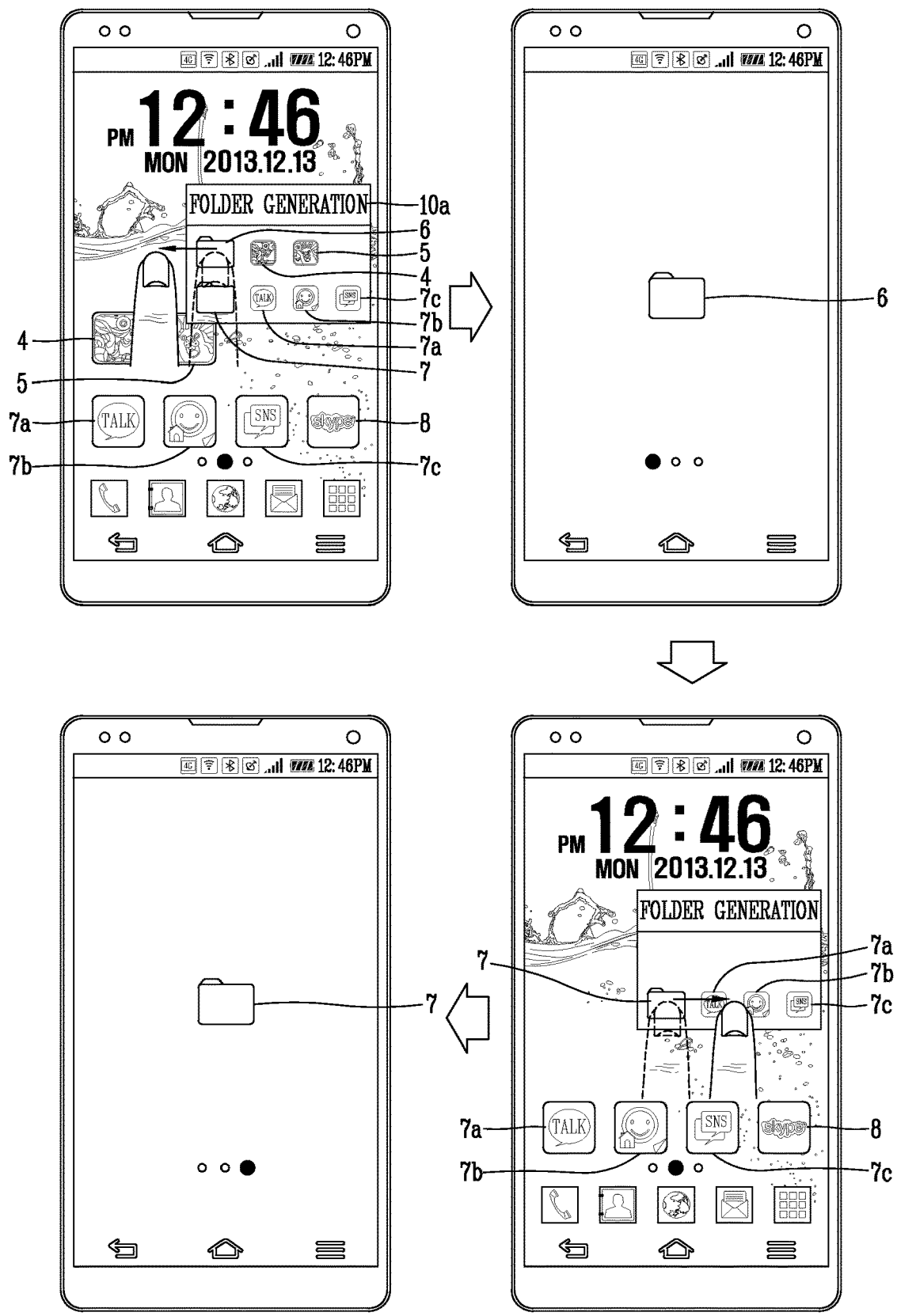

FIG. 3A is a view illustrating an embodiment in a case where an input is applied in correspondence to output of an indicator indicating generation of a folder. FIG. 3B is a view illustrating an embodiment in a case where an input is not applied in correspondence to output of the indicator. FIG. 3C is a view illustrating an embodiment in a case where a directional input is applied in correspondence to output of the indicator.

Referring to a first drawing of FIG. 3A, the home screen page 10 may include icons corresponding to a plurality of applications. In this instance, if a specific touch input (e.g., a long touch input applied for more than a predetermined time) is applied to one of the icons corresponding to a plurality of applications, a graphic object 4a may be output to a specific position of the one icon 4. If a touch input is applied to the graphic object 4a, the controller 180 may execute a function to edit the icons corresponding to the applications included in the home screen page 10. The controller 180 may generate a folder including at least part of the applications, by using attribute information of the applications corresponding to the icons included in the home screen page 10.

As shown in a second drawing of FIG. 3A, the controller 180 may output an indicator 10a indicating generation of the folder, to one region of the home screen page 10. The indicator 10a may be output with including an image 6 of a folder generated based on attribute information of the applications, and icons 4, 5 corresponding to applications included in the folder.

A preset touch input may be applied to the output indicator 10a. The preset touch input may mean a preset type of touch input applied to an output region of the indicator 10a. That is, as shown in a third drawing of FIG. 3A, a touch input may be applied to the folder image 6 included in the output region of the indicator 10a. In this instance, the controller 180 may output the folder image 6 to which the touch input has been applied, to the home screen page 10. The controller 180 may delete the icons 4, 5 corresponding to applications included in the folder image 6, from the home screen page 10.

Thus, as shown in a fourth drawing of FIG. 3A, the folder image 6a indicating a folder including the applications corresponding to the icons 4 and 5, rather than the already-output icons 4 and 5 corresponding to the applications may be output to the home screen page 10. The controller 180 may delete the output folder image 6 from the indicator 10a.

Once a user's input is applied to the output indicator indicating generation of the folder, an image of the folder is output. Thus, whether a user wishes to edit icons or not can be checked, and the home screen page can be arranged according to the user's intention.

Even if the indicator has been output, an additional input may not be applied to the indicator. That is, as shown in FIG. 3B, a request for editing icons corresponding to applications included in the home screen page 10 may be received by using the icon 4 corresponding to an application included in the home screen page 10. In this instance, as in FIG. 3A, the controller 180 may output an indicator 10a indicating generation of the folder, to the home screen page 10 according to the edition request.

In the output state of the indicator 10a, a user's input may not be applied to the touch screen 151 for a predetermined time. More specifically, if no touch input is applied to an output region of the indicator 10a for a predetermined time, the controller 180 may terminate the output of the indicator 10a, as shown in a third drawing of FIG. 3B.

If no input is received even in the output state of the indicator, a user may not wish to output an image of the automatically-generated folder. Thus, if no input is received for a predetermined time, the controller 180 may terminate the output of the indicator 10 by reflecting a user's intention.

The home screen page may include a plurality of pages. In this instance, an image of the generated folder may be output to any page among the plurality of pages. The image of the generated folder may be output to a home screen page selected based on a user's input.

Referring to FIG. 3C, two folders 6 and 7 may be generated based on attribute information of applications corresponding to a plurality of icons 4, 5, 7a, 7b, 7c and 8 included in the home screen page 10. As shown in a first drawing of FIG. 3C, a directional touch input may be applied to the first folder image 6 of the indicator 10a. That is, if a leftward touch input is applied to the folder image 6, the folder image 6 may be output to a page positioned on the left of an output page of the indicator 10a, as shown in a second drawing of FIG. 3C.

Likewise, as shown in a third drawing of FIG. 3C, a rightward touch input may be applied to the folder image 7 remaining at the indicator 10a, after the folder image 6 has been output. In this instance, the controller 180 may output the folder image 7 to a page positioned on the right of the output page of the indicator 10a, as shown in a fourth drawing of FIG. 3C.

Thus, a user may select an output page of an image of a generated folder by controlling a direction of a touch input, at the time of outputting the image using the indicator. However, the present invention is not limited to this. That is, a specific page corresponding to a preset type of touch input may be set, and then the folder image may be output to the specific page by applying the preset type of touch input.

Icons corresponding to applications included in the home screen page may be icons corresponding to applications selected by a user among applications installed at the mobile terminal. The home screen page may be provided with an icon corresponding to a specific application, as well as icons corresponding to already-selected applications, according to a user's request. In this instance, an embodiment related to generation of the folder will be explained with reference to FIG. 4.

Figure 4:
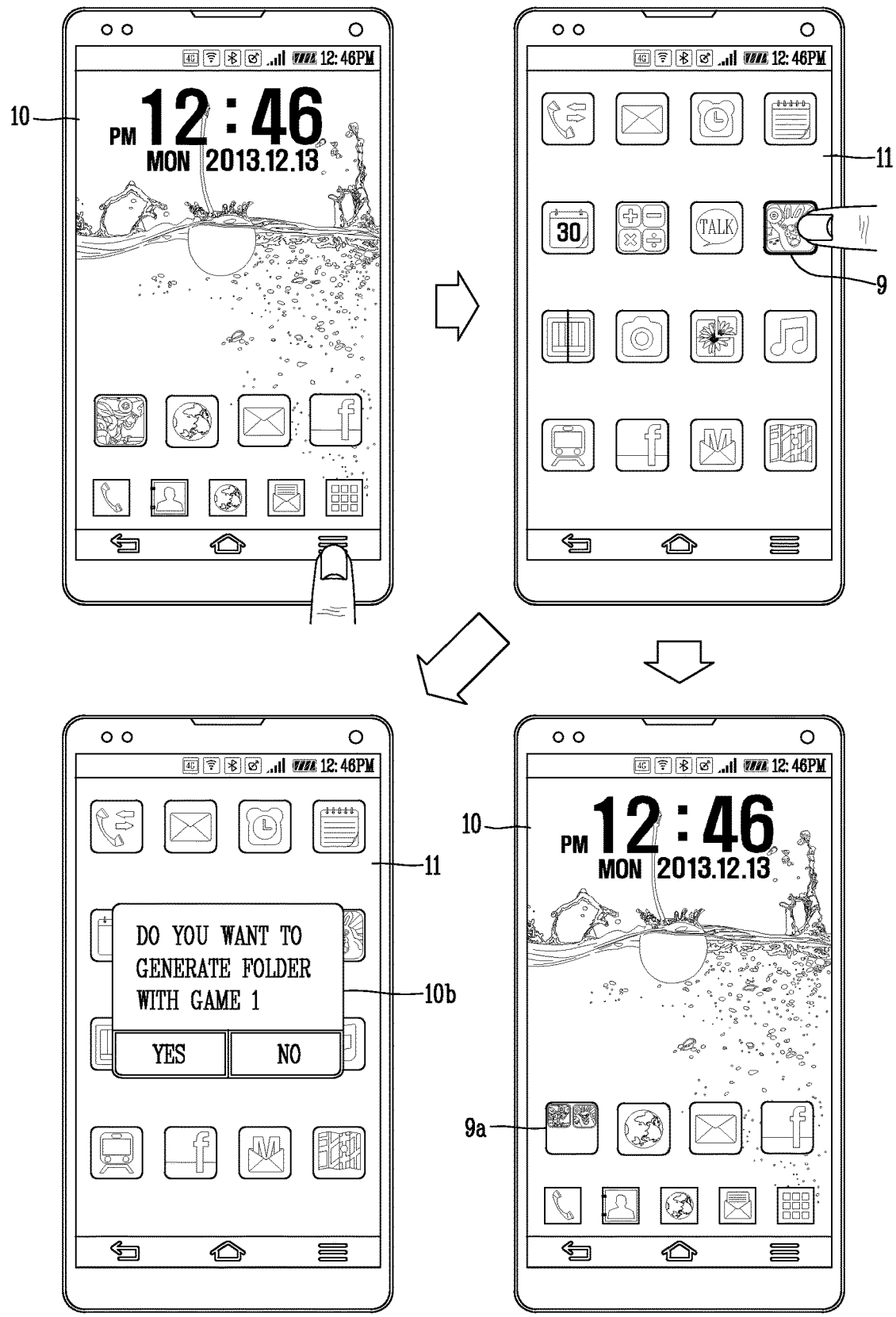
FIG. 4 is a view illustrating an embodiment related to an icon editing function when an icon corresponding to a specific application is added to a home screen page.

FIG. 4 is a view illustrating an embodiment related to an icon editing function when an icon corresponding to a specific application is added to the home screen page.

As shown in a first drawing of FIG. 4, if a user's request is applied in an output state of the home screen page 10, a menu screen 11 showing icons corresponding to applications installed at the mobile terminal may be output to the touch screen 151. If a preset touch (e.g., a long touch maintained for more than a predetermined time) is applied to an icon 9 of a specific application included in the menu screen 11, the icon 9 of the specific application may be included in the home screen page 10.

If the icon 9 of the specific application is added to the home screen page 10, the controller 180 may analyze attribute information of the specific application. Further, the controller 180 may compare attribute information of applications corresponding to the icons included in the home screen page 10, with the attribute information of the specific application. Then, the controller 180 may generate a folder by using the specific application, and by using applications having similar attribute information to the specific application.

If a new folder is generated as the icon of the specific application is added to the home screen page 10, the controller 180 may output the generated folder 9a to the home screen page 10 as shown in a third drawing of FIG. 4. Further, the controller 180 may delete icons corresponding to applications included in the generated folder 9a, from the home screen page 10.

The controller 180 may output, to the touch screen 151, a popup window 10b asking a user whether to generate a folder including the specific application and applications having similar attribute information to the specific application. In this instance, the controller 180 may determine whether to generate the folder or not, based on a user's input applied to the popup window 10b. That is, if a user applies an input for selecting generation of the folder, the controller 180 may output an image of the generated folder to the home screen page. On the other hand, if a user applies an input for restricting generation of the folder, the controller 180 may directly output the icon of the specific application to the home screen page.

Thus, a user may be automatically provided with an icon edition function with respect to a new application, by merely adding the icon of the new application to the home screen page. Further, the user may determine whether to output, to the home screen page, the icon of the new application, or an image of a folder including the new application.

According to another embodiment of the present invention, if an edition request with respect to icons corresponding to applications included in the home screen page is received, the controller 180 may set at least one region of the home screen page as a control region for editing the icons. Then, the controller 180 may perform a function to edit the icons included in the home screen page, based on a touch input applied to the control region.

More specifically, the controller 180 may output, to the at least one region, the icons and an image of a folder generated based on attribute information of the applications. For instance, the controller 180 may output a control screen including the icons and the folder image, to the at least one region. The controller 180 may output an image of the generated folder, to the home screen page, based on a touch input applied to the control screen. The controller 180 may perform an edition function with respect to the icons and the folder image, based on a touch input applied to the control screen. Hereinafter, an embodiment to generate and unfold a folder will be explained in more detail with reference to FIGS. 5A and 5B.

Figure 5A:
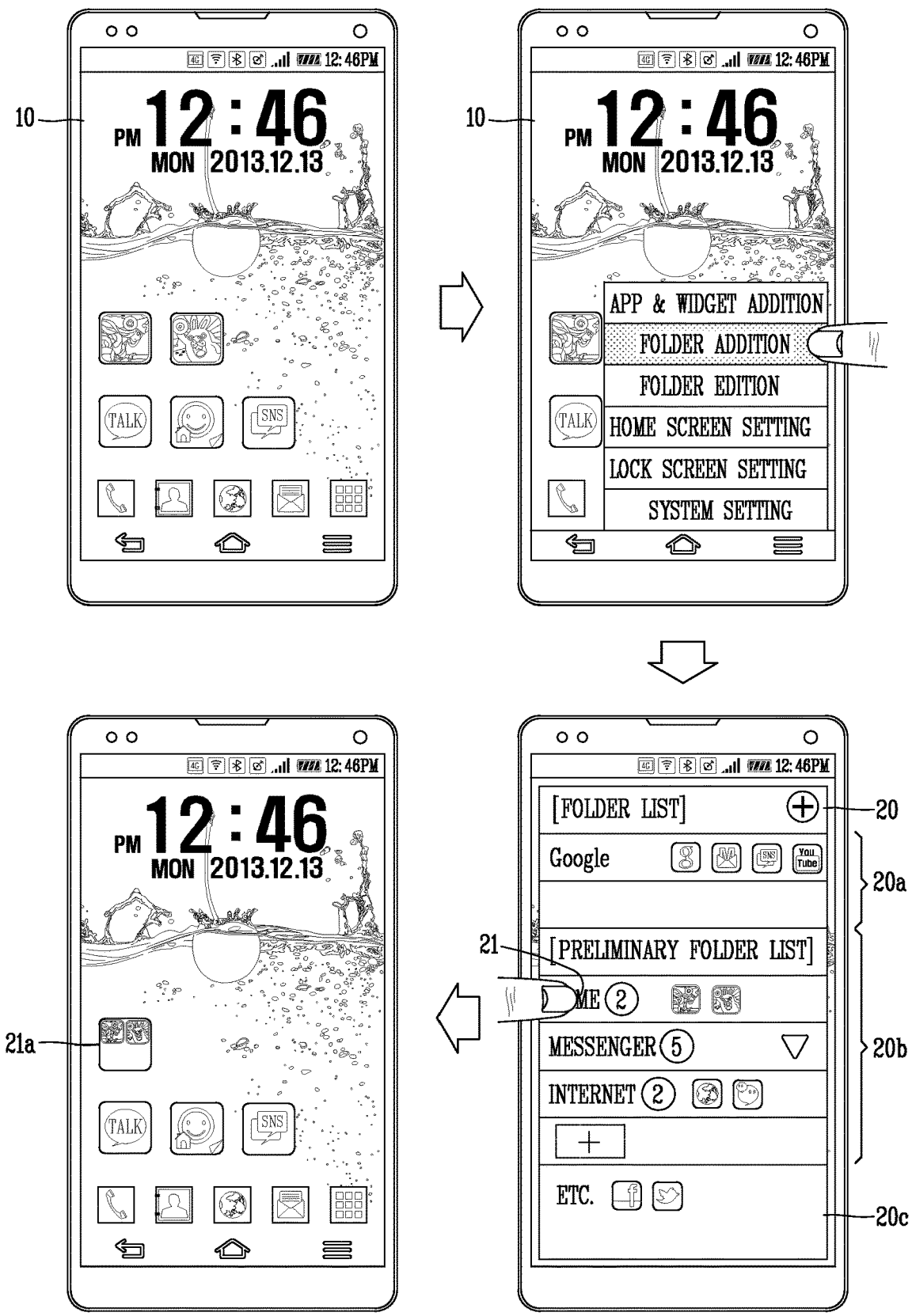
FIGS. 5A and 5B are views illustrating a method of controlling an output state related to a folder image, on a home screen page, using a control screen.
Figure 5B:
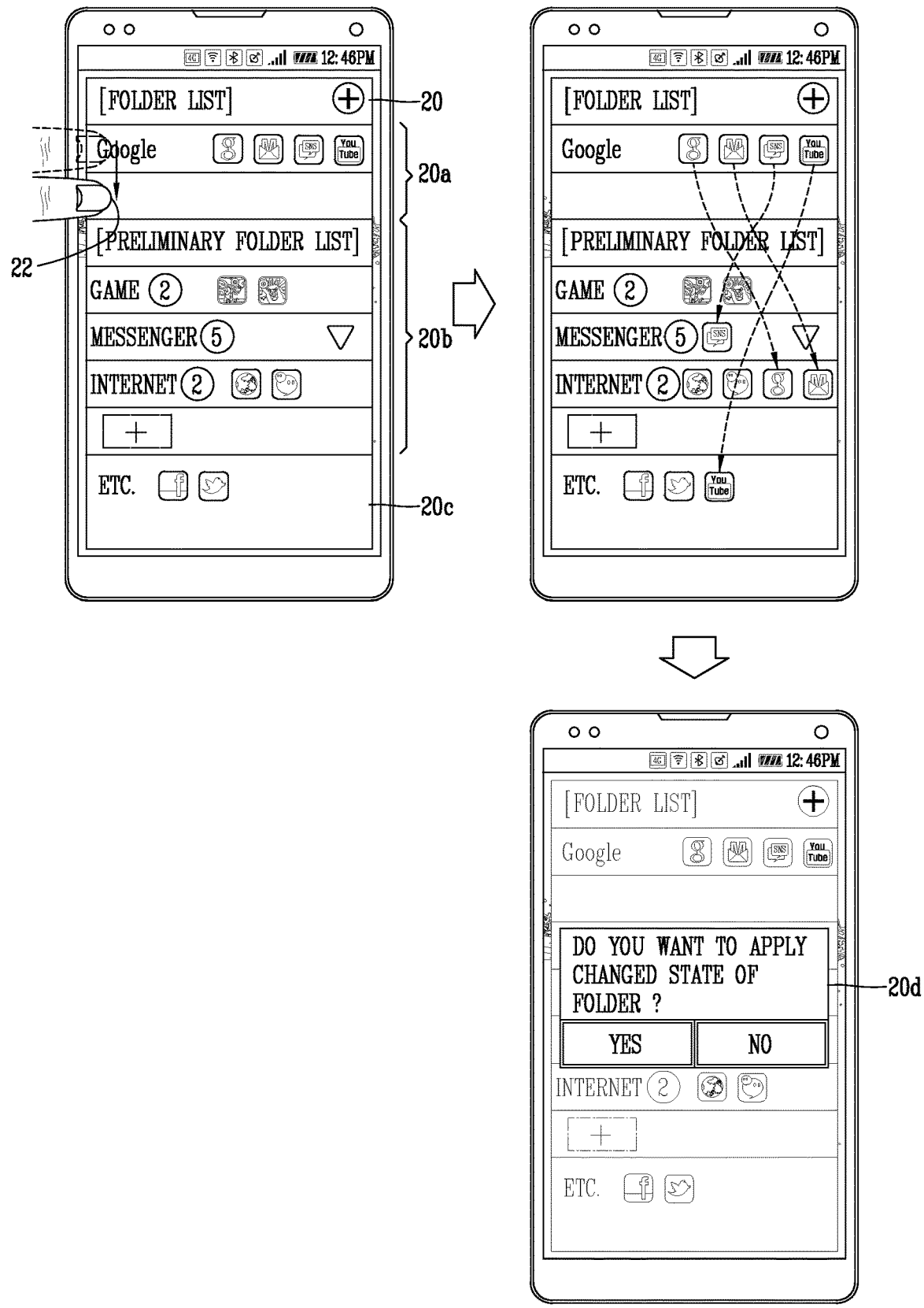

FIG. 5A is a view illustrating a method of outputting an image of a generated folder by using the control screen, and FIG. 5B is a view illustrating a method of unfolding an already-generated folder by using the control screen.

Referring to FIG. 5A, in an output state of the home screen page, an icon edition function may be executed according to a request for editing icons included in the home screen page. Once the icon edition request is received, the controller 180 may output a control screen 20 to at least one region of the touch screen 151. That is, as shown in a second drawing of FIG. 5A, the controller 180 may output the control screen 20 including the icons included in the home screen page, and including graphic objects indicating folders related to attribute information of applications corresponding to the icons.

More specifically, the control screen 20 may include a region 20a for displaying an image of an already-generated folder included in the home screen page, and for displaying icons corresponding to applications included in the already-generated folder. The control screen 20 may further include a region 20b for displaying an image of a folder generated based on attribute information of applications corresponding to icons included in the home screen page, and for displaying icons corresponding to applications included in the generated folder. The control screen 20 may further include a region 20c for displaying other icons which have not been sorted based on attribute information of the applications among icons included in the home screen page.

In the output state of the control screen 20, if a touch input is applied to an image of a folder generated based on attribute information of applications, the controller 180 may output the image of the folder to the home screen page 10. That is, as shown in a third drawing of FIG. 5A, a touch input may be applied to an image 21 of a folder generated based on an execution function (e.g., game). In this instance, as shown in a fourth drawing of FIG. 5A, the controller 180 may terminate the output of the control screen 20, and may output the image 21 of the folder to the home screen page.

The controller 180 may not only output an image of a generated folder to the home screen page, but also unfold an already-generated folder, by using the control screen. That is, referring to FIG. 5B, the one region 20a of the control screen 20 may include an image 22 of an already-generated folder, and icons corresponding to applications included in the already-generated folder. In this instance, a preset type of touch input (e.g., a touch input applied to the another region 20b from the one region 20a) may be applied to the image 22 of the already-generated folder.

In this instance, the controller 180 may unfold the already-generated folder. More specifically, once the preset type of touch input is received, the controller 180 may analyze attribute information of each application included in the already-generated folder. Then, the controller 180 may search a folder including applications having similar attribute information to the applications included in the already-generated folder, among folders included in said another region 20b. If a folder including applications having similar attribute information to the applications included in the already-generated folder has been searched, the controller 180 may include icons corresponding to the applications included in the already-generated folder, in an image of the searched folder. However, if a folder including applications having similar attribute information to the applications included in the already-generated folder has not been searched, the controller 180 may move icons corresponding to the applications included in the already-generated folder, to the region 20c for displaying other icons.

As shown in a third drawing of FIG. 5B, if an input to terminate the output of the control screen 20 is applied, the controller 180 may check whether an edited state of icons processed on the control screen 20 is to be reflected onto the home screen page or not. Although not shown, if a user's input to apply a changed state of a folder due to generation and unfolding of the folder is applied, the controller 180 may change an output state of the home screen page, by reflecting the changed state of the folder to the home screen page.

The mobile terminal according to the present invention may output a control screen for editing icons corresponding to applications included in a home screen page, and a folder. The controller 180 may edit the icons and the folder included in the home screen page, based on a touch input applied to the control screen. Thus, a user can be provided with information about folders generated as applications are automatically sorted based on attribute information of applications corresponding to the icons included in the home screen page. Further, a user can easily perform an edition function with respect to the icons, on the home screen page, by applying a touch input to the control screen.

If an icon corresponding to a new application is added to the home screen page, the control screen may reflect information about the new application thereto. Hereinafter, this will be explained in more detail with reference to FIGS. 6A and 6B.

Figure 6A:
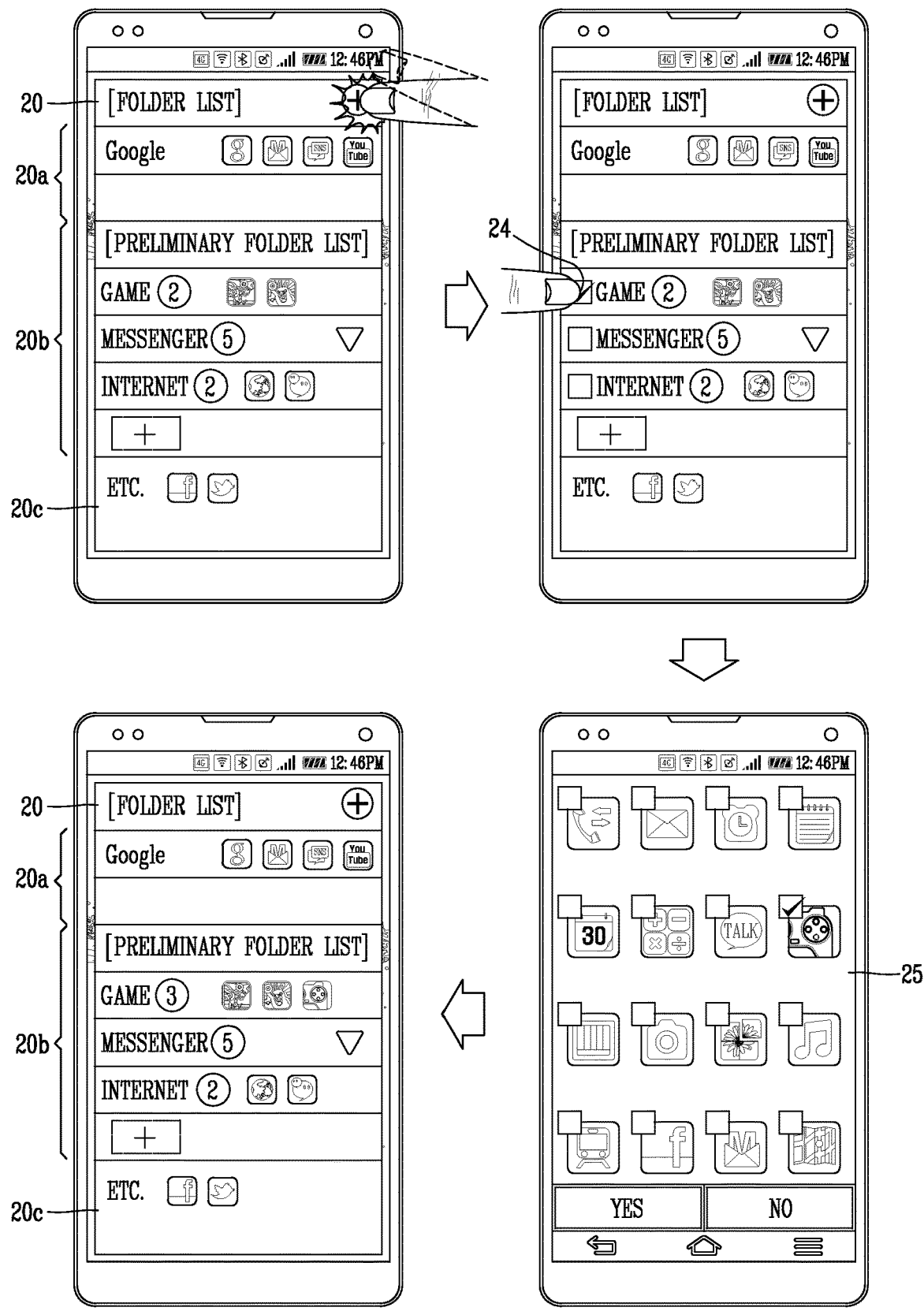
FIGS. 6A and 6B are views illustrating a method of editing icons added to a home screen page, using a control screen.
Figure 6B:
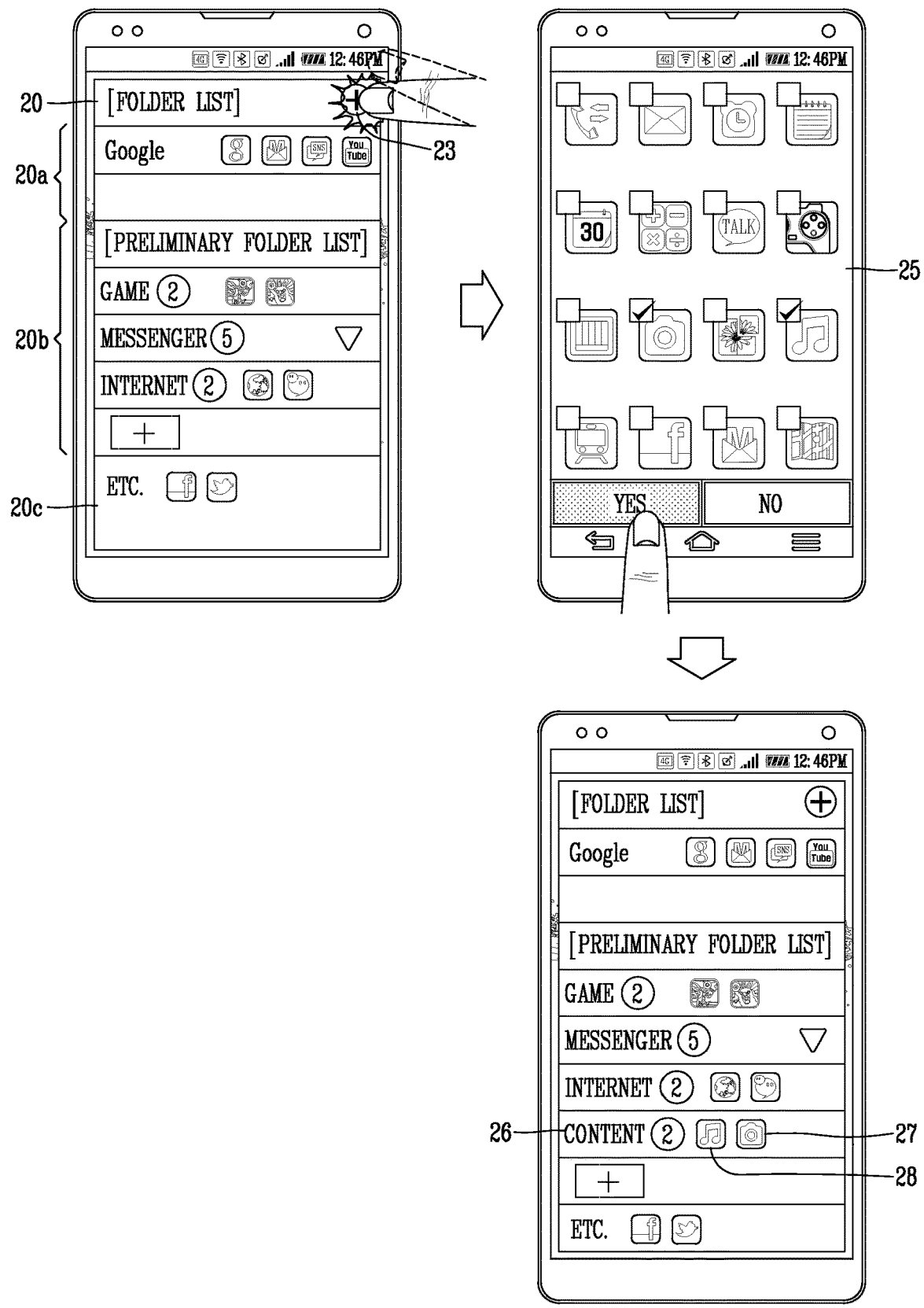

FIG. 6A is a view illustrating an embodiment to add an icon corresponding to a new application, to a folder generated based on attribute information of applications, by using a control screen. FIG. 6B is a view illustrating an embodiment to automatically edit icons added to the home screen page by using the control screen.

Referring to FIG. 6A, a specific function key 23 may be included in one region of the control screen 20. The specific function key 23 may be a function to add an icon corresponding to a new application which is not included in the home screen page, among applications installed at the mobile terminal. If a touch input is applied to the specific function key 23, the controller 180 may change the control screen 20 so that an image of a folder including the icon added to the home screen page can be selected.

That is, as shown in a second drawing of FIG. 6A, a check box for selection may be displayed on each folder image included in the control screen 20. If a specific folder image is selected by a user, the controller 180 may output a list screen 25 of icons which are addable to the specific folder image, to the touch screen 151, as shown in a third drawing of FIG. 6A. The controller 180 may control a specific icon selected by the user, to be included in the specific folder image, based on a touch input applied to the list screen 25.

Thus, as shown in a fourth drawing of FIG. 6A, an image 24 of a game folder, included in the control screen 20, may include the specific icon. If a request for terminating the output state of the control screen 20 is received, the controller 180 may change an output state of the home screen page, by applying a changed state of the control screen 20 to the home screen page.

If a new icon is added to the home screen page, the controller 180 may output edition information about the icon to the control screen. The edition information indicates that the icon has been automatically edited based on attribute information of an application corresponding to the new icon. Referring to a first drawing of FIG. 6B, a touch input may be applied to the specific function key 23 included in the control screen 20. In this instance, as shown in a second drawing of FIG. 6B, the controller 180 may output the list screen 25 of icons to be newly-added to the home screen page, to the touch screen 151. The controller 180 may control the touch screen 151 so that a check box for selecting each icon included in the list screen 25 can be displayed on the each icon.

If a specific icon is selected by a user, the controller 180 may analyze attribute information of an application corresponding to the selected specific icon. The controller 180 may compare attribute information of the application corresponding to the selected specific icon, with attribute information of each folder generated on the control screen 20 based on attribute information of applications.

If there is a folder including applications having similar attribute information to an application corresponding to an icon selected from the list screen 25, the controller 180 may control the selected icon to be included in an image of the folder included in the control screen 20. If there is not a folder including applications having similar attribute information to an application corresponding to the selected icon, the controller 180 may control the selected icon to be included in the region 20c on the control screen 20, the region 20c for displaying icons which have not been sorted based on attribute information of applications.

As shown in a second drawing of FIG. 6B, if icons corresponding to music and photo applications are selected by a user, the controller 180 may analyze attribute information of the music and photo applications (e.g., an execution function). In a case where a plurality of icons are selected, the controller 180 may compare attribute information of applications corresponding to the plurality of icons with each other.

If applications corresponding to the plurality of icons have different attribute information from each other, each of the plurality of icons may be independently processed, i.e., each of the plurality of icons may be separately included in an image of a folder corresponding to attribute information of an application. However, as shown in FIG. 6B, since the music and photo applications have similar attribute information in that they deal with content information, the controller 180 may generate a folder by using icons corresponding to the music and photo applications. Thus, as shown in a third drawing of FIG. 6B, an image of a folder including icons corresponding to the music and photo applications, i.e. a content folder 26 may be included in the control screen 20.

A user can add icons corresponding to new applications to the home screen page by using the control screen, and can automatically perform an edition function with respect to the icons corresponding to the new applications.

As aforementioned, attribute information of applications may be sorted in plurality of attribute information, i.e., an execution function of the applications, a usage frequency of the applications, etc. The controller 180 may edit icons included in the home screen page, based on preset attribute information among the plurality of attribute information. If a user wishes to edit the icons based on another attribute information different from the preset attribute information, the icons may be edited based on said another attribute information, by using the control screen. This will be explained in more detail with reference to FIG. 7.

Figure 7:
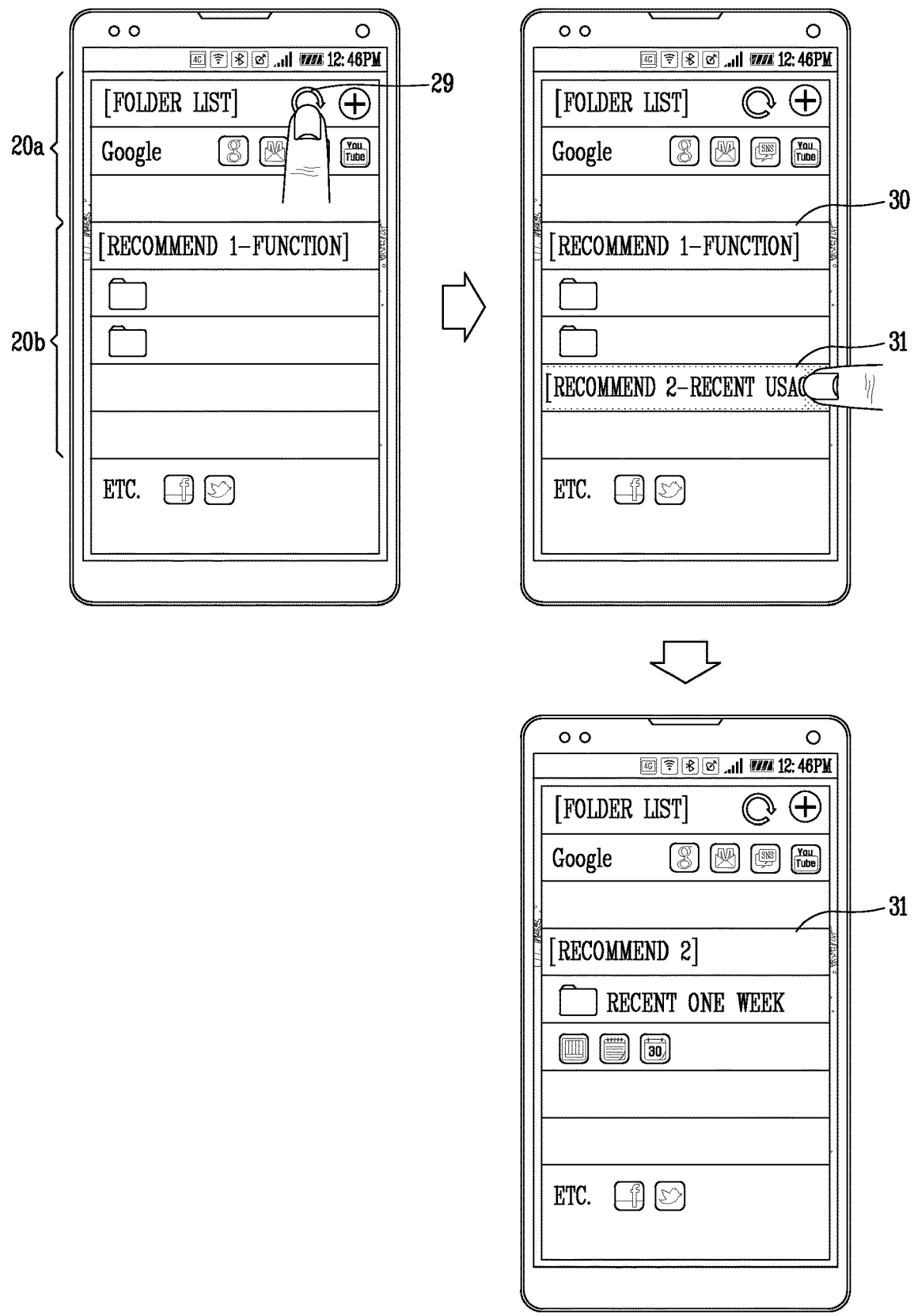
FIG. 7 is a view illustrating an embodiment to provide a folder generated based on attribute information different from preset attribute information of a preset application, using a control screen.

FIG. 7 is a view illustrating an embodiment to provide a folder generated based on attribute information different from preset attribute information, by using the control screen, in a case where attribute information of applications can be sorted into a plurality of attribute information.

Referring to FIG. 7, the control screen 20 may include an image of an already-generated folder included in the home screen page, and an image of a folder generated based on attribute information of applications. The image of the generated folder may include icons sorted from each other based on preset attribute information (e.g., functions corresponding to applications).

The control screen 20 may include a specific function key 29. The specific function key 29 may be formed to edit icons included in the home screen page based on attribute information different from preset attribute information, in a case where there is another attribute information which can be sorted, as well as the preset attribute information.

As shown in a first drawing of FIG. 7, a touch input may be applied to the specific function key 29. In this instance, the controller 180 may edit icons included in the home screen page, based on attribute information different from preset attribute information, among attribute information of applications corresponding to the icons. More specifically, if the preset attribute information is a function of applications, the controller 180 may re-edit icons included in the home screen page, based on attribute information, i.e., a usage time point of the applications. The controller 180 may generate a new folder based on the different attribute information, and may change the control screen 20 by reflecting the new folder.

Thus, as shown in a second drawing of FIG. 7, not only an image 30 of a folder generated based on preset attribute information, but also an image 31 of a folder generated based on the different attribute information (a usage time point of applications) may be displayed on the control screen 20. If a user's input is applied to the image 31 of the folder generated based on the different attribute information, the controller 180 may output the folder image 31 and icons included in the folder image 31, to the control screen 20, as shown in a third drawing of FIG. 7. Then, the controller 180 may output the folder image 31 generated based on the different attribute information, to the home screen page, based on an additional touch input applied to the control screen 20.

A user can differently set attribute information of applications, a basis for editing icons, by using the control screen. That is, a user can easily edit icons included in the home screen page, based on various bases (a plurality of sorted attribute information of applications).

The control screen may display information about an output state of the home screen page (e.g., the number of applications included in the home screen page, whether an icon corresponding to an application installed real-time has been included in the home screen page, etc.). The control screen may also display position information about each icon corresponding to an application and included in the home screen page, i.e., information indicating a page where each icon is positioned among a plurality of home screen pages. The control screen may also display an image of a folder arbitrarily generated based on a folder image output to the home screen page, or based on attribute information of applications. The control screen may provide an edition function by moving icons included in each folder image. Hereinafter, this will be explained in more detail with reference to FIGS. 8A to 8C.

Figure 8A:
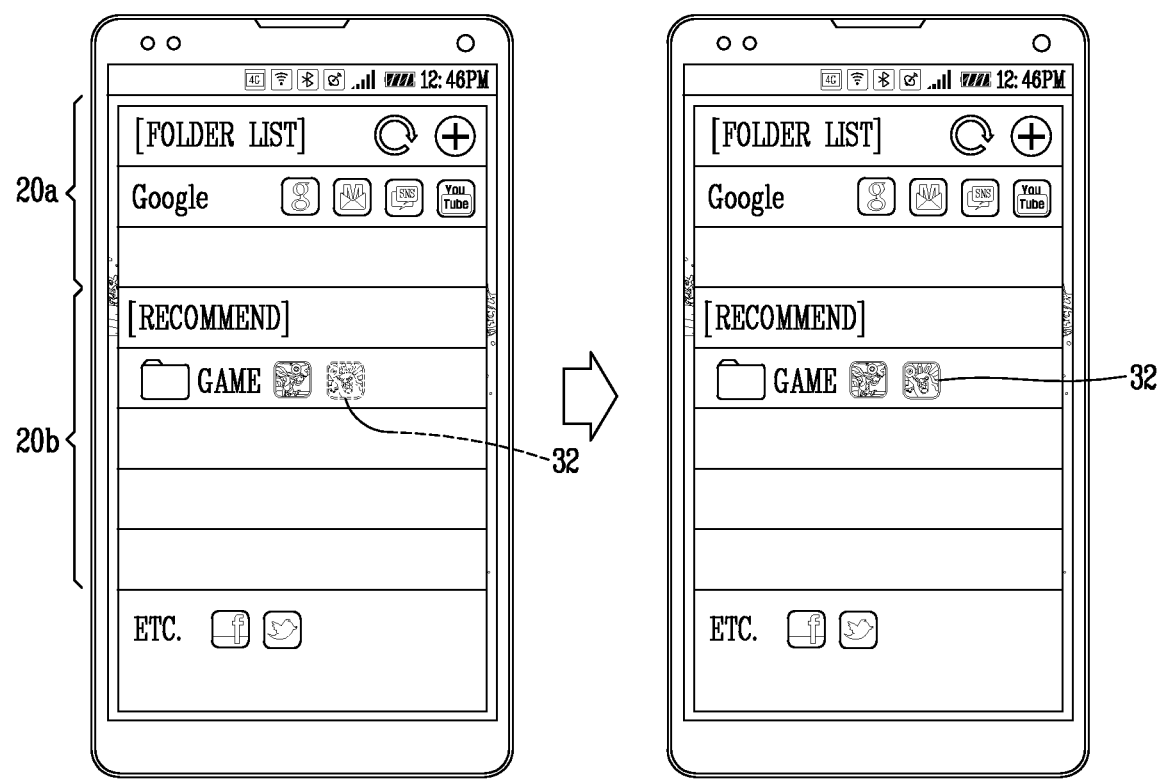
FIGS. 8A to 8C are views illustrating embodiments to change an output state of a home screen page, using a control screen.

Referring to FIG. 8A, a new application may be installed at the mobile terminal. When the new application is installed at the mobile terminal, an icon corresponding to the new application may be included in the home screen page. If the control screen 20 is output to the touch screen 151, the icon corresponding to the new application may be included in the home screen page, and may be displayed on the control screen 20.

That is, as shown in a first drawing of FIG. 8, an icon 32 corresponding to the new application may be displayed on the control screen 20. The controller 180 may analyze attribute information of the new application, and may control an icon corresponding to the new application to be included in an image of a folder corresponding to the attribute information of the new application. The controller 180 may control the touch screen 151 so that the icon 32 corresponding to the new application can be displayed in a semi-transparent state, until the new application is completely installed.

Then, if the new application is completely installed, the controller 180 may control the touch screen 151 so that the icon 32 corresponding to the new application can be displayed with a preset transparent degree, as shown in a second drawing of FIG. 8A.

Thus, if an icon corresponding to a new application being installed is included in the home screen page, an edition function may be automatically executed on the control screen, based on attribute information of the newly-installed application. The control screen may display information about an installed state of the new application being installed, by controlling a transparent degree of the icon corresponding to the new application being installed.

If the home screen page is composed of a plurality of pages, position information indicating a page on which each icon is positioned among the plurality of pages, may be displayed on said each icon and each folder image included in the control screen. That is, as shown in a first drawing of FIG. 8B, position information related to the plurality of pages may be displayed on each icon included in the home screen page. For instance, position information 33a, which indicates that a specific icon 33 is positioned on a third page among the plurality of pages, may be displayed on the specific icon 33.

Figure 8B:
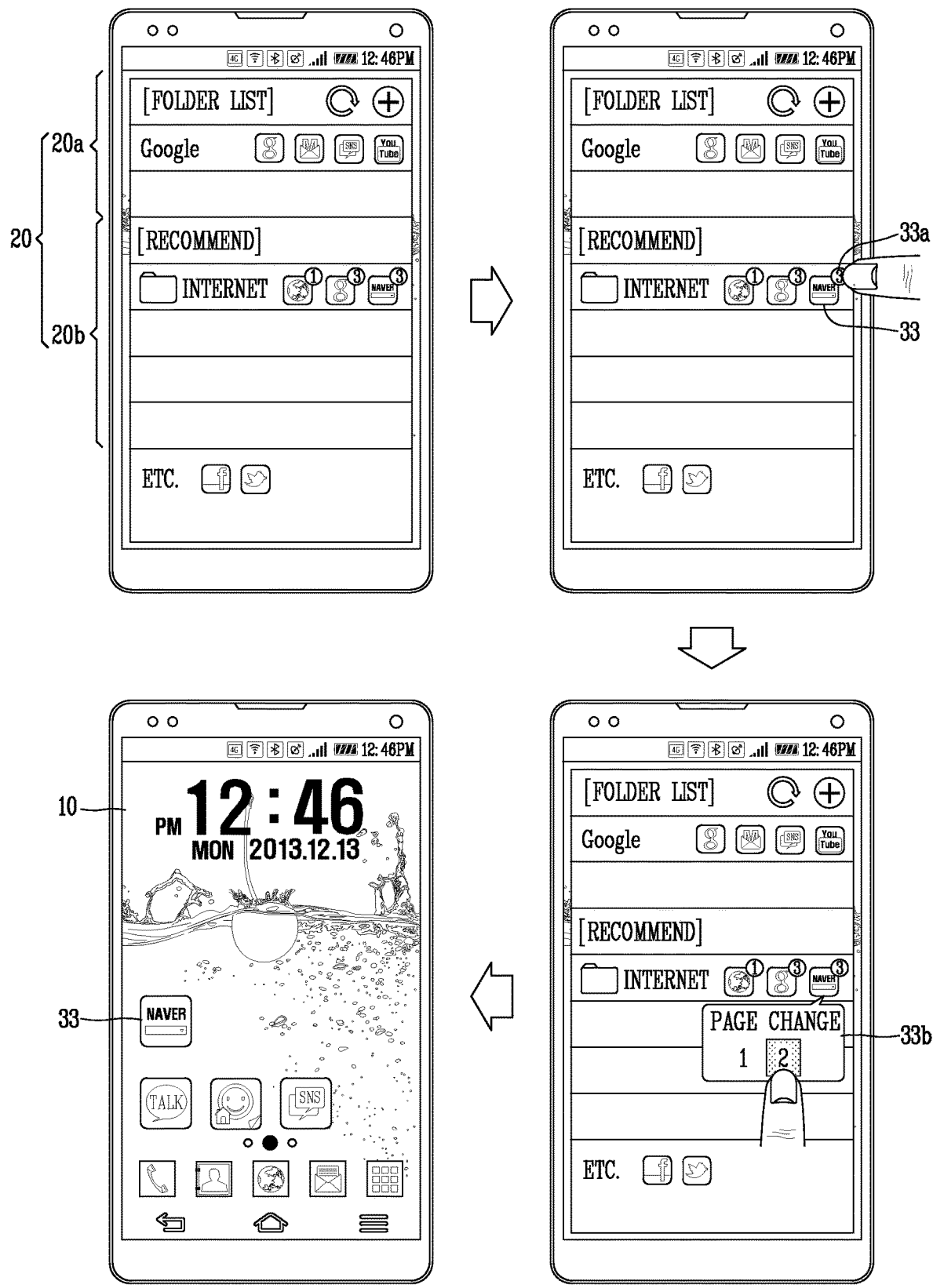

If a touch input is applied to the position information 33a as shown in a second drawing of FIG. 8B, a window 33b for changing the position information 33a of the specific icon 33 may be output to the control screen 20 as shown in a third drawing of FIG. 8B. For instance, if a user applies an input for changing the position information 33a, the position information 33a of the specific icon 33 may be changed to a second page from a third page. Thus, if the output state of the control screen 20 is terminated, a position of the specific icon 33 on the home screen page may be changed to the second page from the third page.

A user can easily change an output state of the home screen page, by changing a position of the icons by using the control screen.

The controller may move icons included in an image of a first folder included in the control screen, to an image of a second folder, based on a touch input. That is, as shown in a first drawing of FIG. 8C, the control screen 20 may include an image 34 of an already-generated folder (messenger folder), and an image 35 of a folder (internet folder) generated based on attribute information of applications. A touch input may be applied to the image 34 of the message folder, from a specific icon 35a included in the image 35 of the internet folder.

Figure 8C:
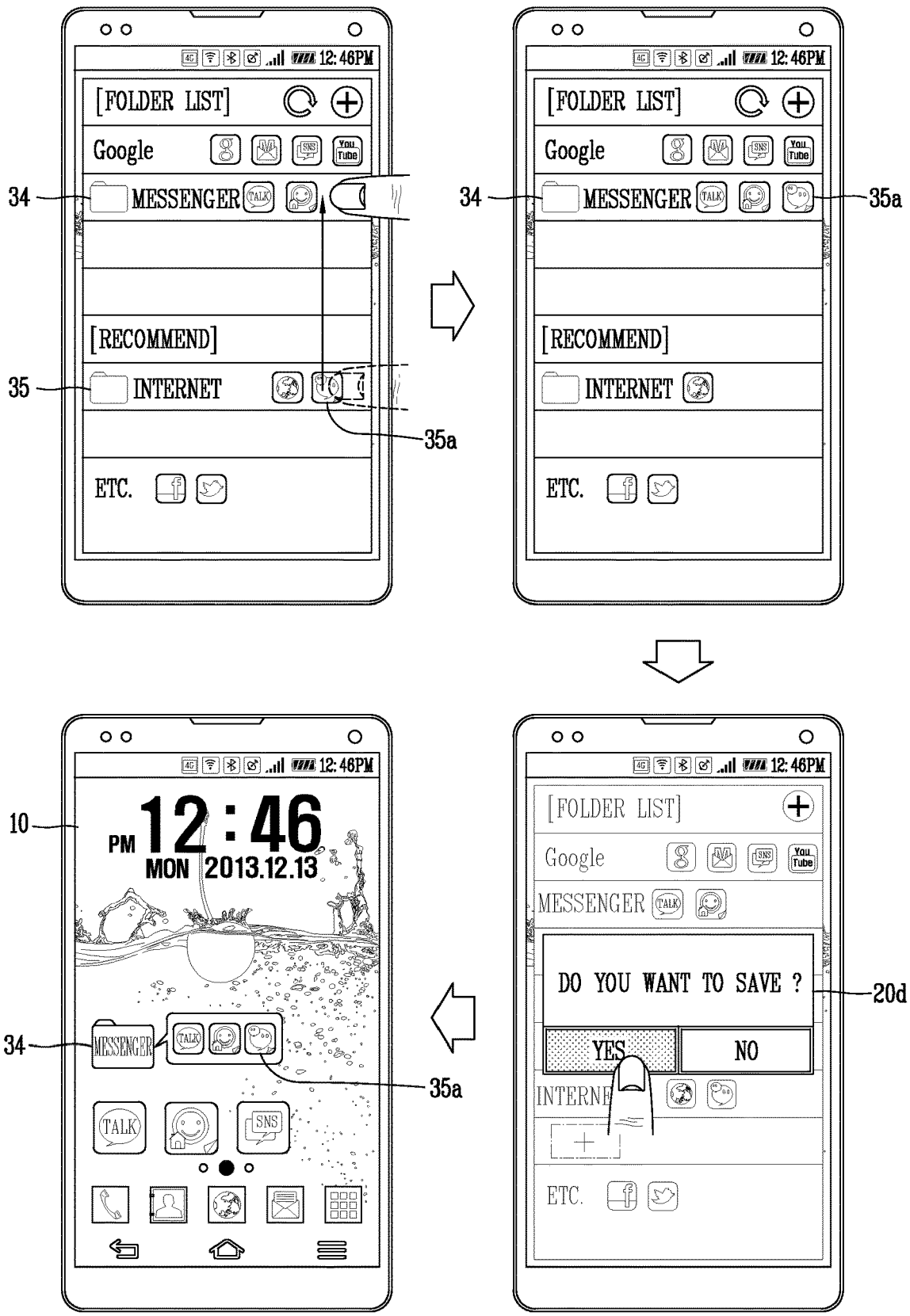

In this instance, as shown in a second drawing of FIG. 8C, the controller 180 may move the specific icon 35a so that the specific icon 35a can be included in the image 34 of the messenger folder. Then, the controller 180 may receive a user's confirmation whether to apply a changed state of the control screen 20 to the home screen page. If a user wishes to apply the changed state of the control screen 20 to the home screen page, the controller 180 may change an output state of the home screen page based on the changed state. As a result, as shown in a fourth drawing of FIG. 8C, the image 34 of the messenger folder including the specific icon 35a may be output to the home screen page.

A user can freely move an icon between folder images with adding, deleting, etc. the icon to/from the folder images included in the home screen page, by using the control screen. Although not shown, two or more folder images included in the control screen can be integrated with each other, and a new folder can be generated by using icons which have not been sorted based on attribute information of applications.

The mobile terminal and the method of controlling the same according to the present invention can have the following advantages.

Since a plurality of icons included in a home screen page are generated in the form of folders based on attribute information of applications corresponding to the icons, a user can be provided with the icons corresponding to the applications, the icons automatically sorted from each other by the generated folders based on similar attribute information. Accordingly, a user can easily sort the icons included in the home screen page in a scattered manner, without an additional input for sorting the plurality of icons.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
   a touch screen configured to output a home screen page including icons corresponding to a plurality of applications, wherein the home screen page includes a plurality of pages; and
   a controller configured to:
      recognize a first touch input received on a first icon among the icons;
      generate a folder including a first application corresponding to the first icon and at least one second application having similar attribute information to the first application, from among the plurality of applications by using attribute information of the first application;
      cause the touch screen to display an indicator indicating the generation of the folder on the home screen page;
      cause the touch screen to display an image of the generated folder on the home screen page in response to a second touch input received on the indicator; and
      cause the touch screen to display the image of the folder on a page selected based on a direction of the second touch input, among the plurality of pages.

2. The mobile terminal of claim 1, wherein the attribute information of the first application is a type of the first application, a usage frequency of the first application, or a usage time point of the first application.

3. The mobile terminal of claim 1, wherein the indicator includes an image representing the folder and images representing second icons of the at least one second application included in the folder.

4. The mobile terminal of claim 1, wherein if the second touch input is not received for a preset time period while the indicator is displayed, the controller is further configured to terminate the displaying the indicator.

5. The mobile terminal of claim 4, wherein the folder is deleted when the indicator is no longer displayed.

6. The mobile terminal of claim 1, wherein the home screen page further includes an image of an already-generated folder, and
   wherein if an unfolding request with respect to the already-generated folder is received, the controller is further configured to move a specific application included in the already-generated folder to a folder corresponding to attribute information of the specific application.

7. The mobile terminal of claim 6, wherein in a state where an image of the folder including the specific application has been output, if a touch input is applied to the image, the controller is further configured to cause the touch screen to display an icon corresponding to the specific application.

8. The mobile terminal of claim 1, wherein an icon corresponding to a specific application is addable to the home screen page according to a user's request,
   wherein in response to the user's request received, the controller is further configured to include the specific application in a folder including applications having similar attribute information to the specific application, among folders included in the home screen page, and
   wherein in response to a touch input applied to an image of the folder including applications having similar attribute information to the specific application, the controller is further configured to cause the touch screen to display an icon corresponding to the specific application.

9. The mobile terminal of claim 8, wherein in response to the user's request received, the controller is further configured to cause the touch screen to display a popup window, the popup window asking a user whether to include the specific application in the folder including applications having similar attribute information to the specific application, and
   wherein the controller is further configured to determine whether to include the specific application in the folder including applications having similar attribute information to the specific application, based on a selective input applied to the popup window.

10. The mobile terminal of claim 1, wherein the controller is further configured to cause the touch screen to display the icons and graphic objects corresponding to folders related to attribute information of the plurality of applications on at least one region of the touch screen in response to an edition request.

11. The mobile terminal of claim 10, wherein the controller outputs is further configured to cause the touch screen to display images of the generated folders to the home screen page in response to a touch input received on the graphic objects.

12. The mobile terminal of claim 10, wherein if the attribute information of the plurality of applications is dividable into a plurality of attribute information, a plurality of graphic objects corresponding to the plurality of attribute information are output to the at least one region of the touch screen, and
   wherein the controller is further configured to include each of the plurality of applications in a folder corresponding to a graphic object selected by a user among the plurality of graphic objects.

13. The mobile terminal of claim 1, wherein the controller is further configured to cause the touch screen to display a graphic object at a specific position of the first icon in response to the first touch input prior to the displaying the indicator.

14. The mobile terminal of claim 1, wherein the image of the folder is not directly displayed on the home screen page until the second touch input is received.

15. The mobile terminal of claim 14, wherein the first icon and at least one second icon corresponding to the at least one second application are not directly displayed on the home screen page when the indicator is displayed.

16. The mobile terminal of claim 15, wherein the controller is further configured to cause the touch screen to stop displaying the indicator and re-display the first icon directly on the home screen page when no user input is received within a predetermined period of time or when the second touch input is not received within the predetermined period of time after the displaying the indicator.

17. A method for controlling a mobile terminal, the method comprising:
  displaying, on a touch screen, a home screen page including icons corresponding to a plurality of applications, wherein the home screen page includes a plurality of pages;
  receiving a first touch input on a first icon among the icons;
  generating a folder including a first application corresponding to the first icon and at least one second application having similar attribute information to the first application by using attribute information of the first application;
  displaying, on the home screen page, an indicator indicating the generation of the folder; and
  displaying, on the home screen page, an image of the folder in response to a second preset touch input received on the indicator,
  wherein, the image of the folder is displayed on a page selected based on a direction of the second touch input, among the plurality of pages.

18. The method of claim 17, wherein the attribute information is a type of the first application, a usage frequency of the first application, or a usage time point of the first application.

19. The method of claim 17, further comprising:
  in a state where an image of an already-generated folder is further included in the home screen page, if an unfolding request with respect to the already-generated folder is received, moving a specific application included in the already-generated folder, to a folder corresponding to attribute information of the specific application, among the folders.

* * * * *